(No Model.)
C. M. DYER.
RAIL SUPPORT.
No. 461,741. Patented Oct. 20, 1891.
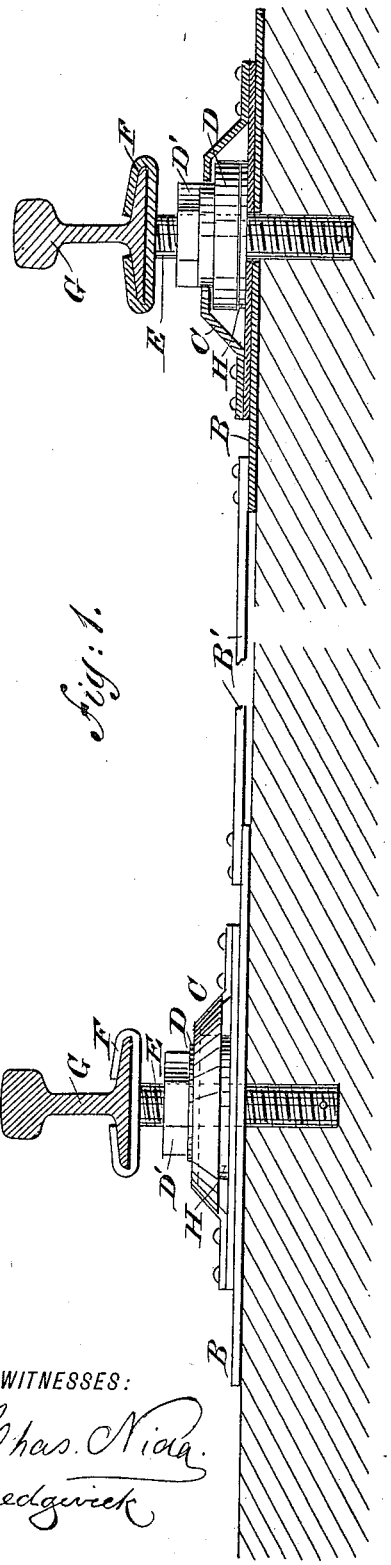
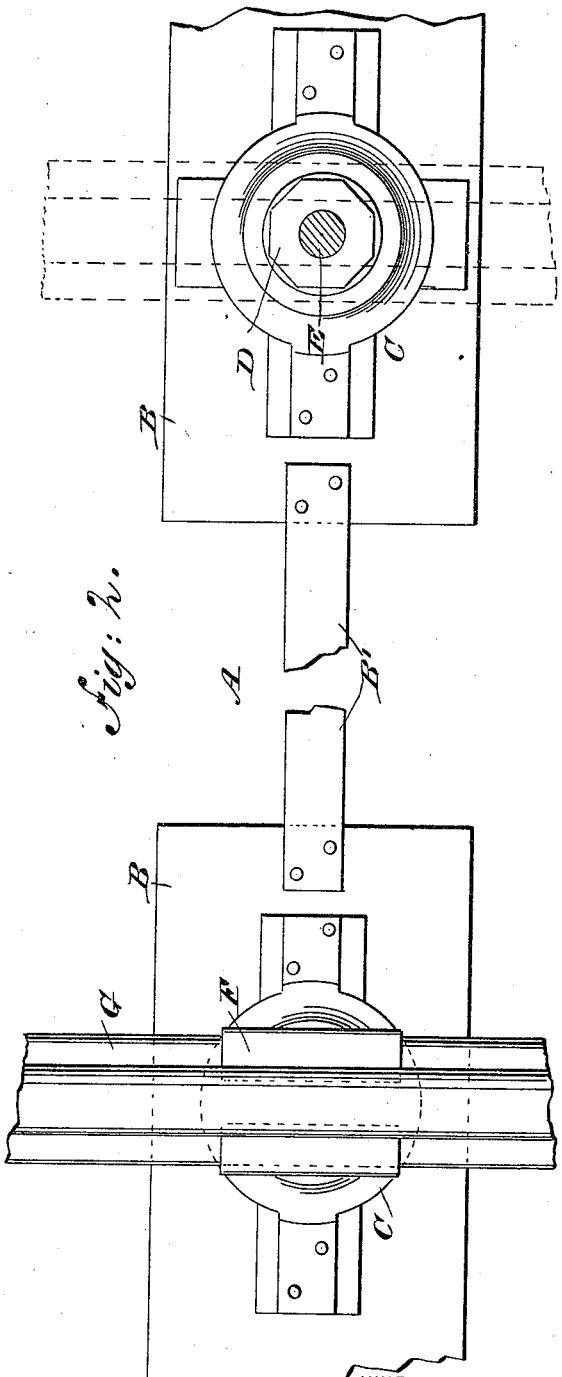
WITNESSES:
Chas. Nida
C. Sedgwick
INVENTOR
C. M. Dyer
BY
Munn & Co
ATTORNEYS.

UNITED STATES PATENT OFFICE.

CHARLES M. DYER, OF CLOVERDALE, INDIANA.

RAIL-SUPPORT.

SPECIFICATION forming part of Letters Patent No. 461,741, dated October 20, 1891.

Application filed July 20, 1891. Serial No. 400,088. (No model.)

*To all whom it may concern:*

Be it known that I, CHARLES M. DYER, of Cloverdale, in the county of Putnam and State of Indiana, have invented a new and Improved Rail-Support, of which the following is a full, clear, and exact description.

The object of my invention is to provide a new and improved rail-support which is simple and durable in construction and permits of conveniently and quickly raising or lowering the rail to keep the track in proper alignment without disturbing the road-bed or ties.

The invention consists of a screw-rod formed with a clamp engaging the base of the rail, a nut engaging the said screw-rod, and a tie-plate formed with a casing in which said nut is mounted to turn.

The invention also consists of certain parts and details and combinations of the same, as will be hereinafter described, and then pointed out in the claims.

Reference is to be had to the accompanying drawings, forming a part of this specification, in which similar letters of reference indicate corresponding parts in both figures.

Figure 1 is a transverse section of the improvement as applied, and Fig. 2 is a plan view of the same with parts in section.

The improved rail-support is provided with a tie A made of two plates B, connected with each other transversely by a bar or rod B', riveted or otherwise fastened to the said two plates. On top of each of the metallic plates B is arranged a casing C, in which is mounted to turn a nut D, engaging a screw-rod E, arranged vertically and passing through the respective plate B. On the upper end of the screw-rod E is formed a clamp F, engaging the base of the rail G so as to support the latter, at the same time holding the rail in place to prevent sidewise displacement.

The upper end D' of the nut D is square or hexagonal and projects above the casing C, so as to be conveniently engaged by a wrench or other tool for turning the said nut in its casing to raise and lower the screw-rod E, thus raising or lowering the rail G, supported by the respective clamp of the screw-rod.

The under side of the nut D rests on a washer H, secured in the bottom of the casing, as is plainly shown in the drawings. The lower end of the nut D is formed with a flange, as is plainly shown at the right in Fig. 1, to prevent displacement of the said nut in the casing and to distribute the pressure over a large area.

It is understood that the operator, by applying a wrench or other suitable tool on the upper end D' of the nut D, can readily turn the said nut in its casing, so that the screw-rod E will be raised or lowered until the rail is in a proper position to bring the track into proper alignment. It will be seen that the rail can thus be conveniently adjusted without disturbing the road-bed or the tie.

Having thus described my invention, what I claim as new, and desire to secure by Letters Patent, is—

1. A rail-support comprising a nut mounted to turn on the tie and a screw-rod screwing in the said nut and carrying a clip engaging the base of the rail, substantially as shown and described.

2. A rail-support comprising a casing held on the tie, a nut mounted to turn in the said casing, a screw-rod screwing in the said nut, and a clamp held on the upper end of the said screw-rod and engaging the base of the rail, substantially as shown and described.

3. The combination, with a metallic railroad-tie comprising two plates and a bar connecting the two plates with each other, of a casing arranged on top of each of said plates, a nut mounted to turn within the said casing and having a projecting polygonal end adapted to be engaged by a wrench or other tool, a screw-rod screwing in the said nut, and a clamp secured on the upper end of the said screw-rod and engaging the base of the rail, substantially as shown and described.

CHARLES M. DYER.

Witnesses:
W. L. DYER,
A. J. ROCKWELL.